R. YOST.
PNEUMATIC TIRE SLEEVE OR PATCH.
APPLICATION FILED MAR. 18, 1916.

1,190,065.

Patented July 4, 1916.

WITNESSES:
Sidney R. Bell
C. Bradway.

INVENTOR
Ray Yost
BY Munn&Co.
ATTORNEY

UNITED STATES PATENT OFFICE.

RAY YOST, OF TYRONE, NEW YORK.

PNEUMATIC-TIRE SLEEVE OR PATCH.

1,190,065.

Specification of Letters Patent.

Patented July 4, 1916.

Application filed March 18, 1916. Serial No. 85,082.

*To all whom it may concern:*

Be it known that I, RAY YOST, a citizen of the United States, and a resident of Tyrone, in the county of Schuyler and State of New York, have invented a new and Improved Pneumatic-Tire Sleeve or Patch, of which the following is a full, clear, and exact description.

This invention relates to tire sleeves, patches or gaiters, and more particularly to the means for fastening the same over a punctured, torn or blown-out tire.

The invention has for its general objects to improve and simplify the construction of devices of this character so as to be reliable and efficient in use, comparatively inexpensive to manufacture, and so designed that a person of ordinary skill can readily apply or detach the sleeve.

A more specific object of the invention is the provision of a novel form of fastener for interlocking with the sleeve, and so designed as to receive a lacing, there being a plurality of hooks or fasteners applied to the sleeve at each side thereof, whereby the lacing can be engaged with the hooks or fasteners alternately at opposite sides of the sleeve and wheel felly.

With such objects in view, and others which will appear as the description proceeds, the invention comprises various novel features of construction and arrangement of parts which will be set forth with particularity in the following description and claims appended hereto.

Figure 1:
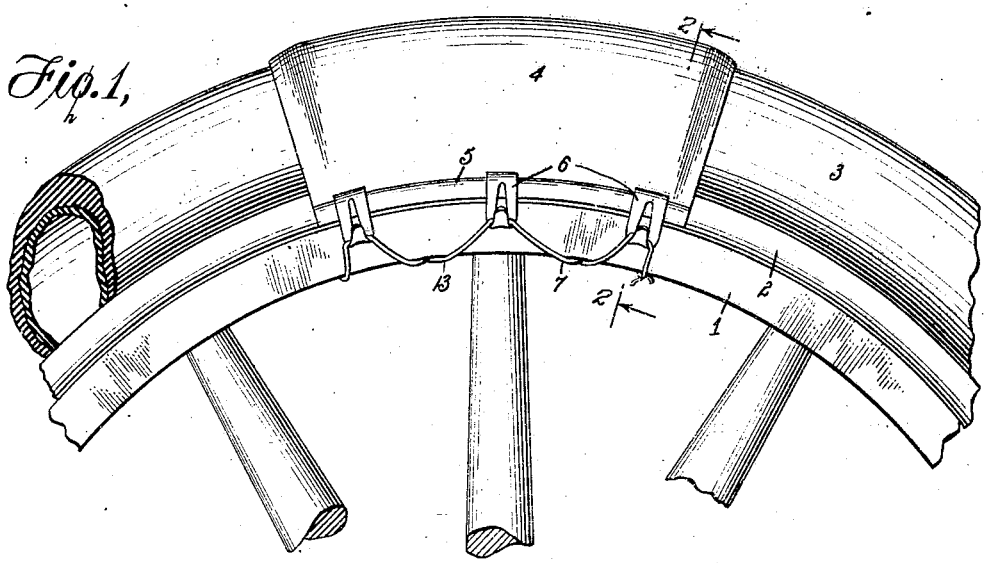
Figure 2:
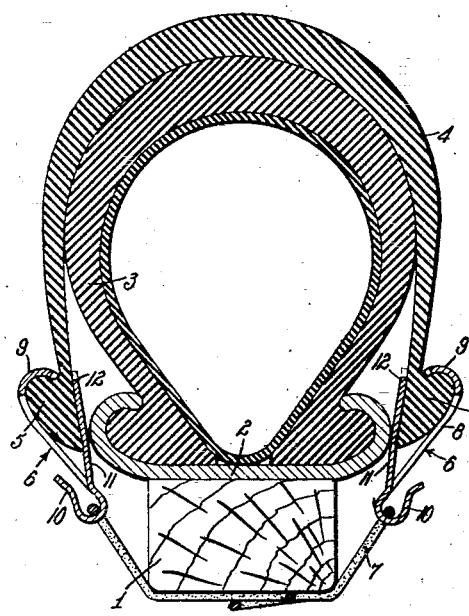
Figure 3:
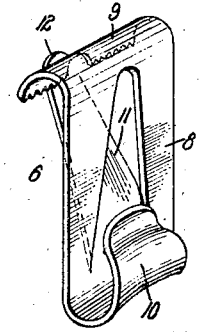
Figure 4:
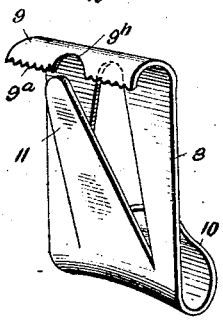

In the accompanying drawing, which illustrates one embodiment of the invention and wherein similar characters of reference indicate corresponding parts in all the views, Figure 1 is a side view of a portion of a vehicle wheel showing a tire sleeve laced thereto; Fig. 2 is an enlarged sectional view on the line 2—2, Fig. 1; Fig. 3 is a perspective view of one of the lacing hooks detached; and Fig. 4 is a similar view of the hook seen from the rear.

Referring to the drawing, 1 designates the felly of a wheel, 2 the rim and 3 the pneumatic tire. The sleeve, patch or gaiter 4 is applied to the tire in the usual manner, the sleeve being a portion of a tire and therefore provided with marginal beads 5. Applied to the beads of the sleeve are fasteners or hooks 6, there being a plurality of hooks on each side for enabling a rawhide or other lacing 7 to be employed to fasten the sleeve in place. The hooks 6 are preferably, although not necessarily made from sheet metal stampings each comprising a plate-like shank or body 8, a bill 9 at one end and a bill 10 at the opposite end, the bills 9 and 10 being at opposite sides or projecting in opposite directions from the body 8. Struck out from the body 8 is a tongue 11, the free end 12 of which lies adjacent the bill 9 at a central point thereof. The bill 9 engages the bead 5 of the sleeve, while the tongue 11 engages under the bead, as shown in Fig. 2. Consequently, the fastener after being once attached to the bead of the sleeve cannot be detached by a pull radially with respect to the wheel. The fasteners are engaged with the sleeve successively by applying them to the end of the beads 5 and sliding the fasteners longitudinally of the bead with the tongues 11 engaged behind or under the beads and the bills 9 over the outside of the beads. After the fasteners are applied to the sleeve the latter is applied over a tire and fastened in place by a rawhide or equivalent lacing 13 which is engaged over the hooks 10 and laced in such a manner that the lacing extends under the wheel felly, passing back and forth to the alternate fasteners at opposite sides of the wheel rim, and after being laced the free ends of the lacing are tied together. The sleeve is preferably, although not necessarily, a section of old tire, so that any person having a number of fasteners and a lacing can make a serviceable sleeve, patch or gaiter from an old tire.

To prevent longitudinal slipping of the hooks or fasteners on the sleeve, the edge of each bill 9 has serrations $9^a$ which bite into the beads 5, and also in the serrated edge is a notch $9^b$ to provide clearance for the tongue 11 to be bent outwardly to the required position.

From the foregoing description taken in connection with the accompanying drawing, the advantages of the construction and method of operation will be readily understood by those skilled in the art to which the invention appertains, and while I have described the principle of operation, together with the device which I now consider to be the best embodiment thereof, I desire to have it understood that the device shown is merely illustrative and that such changes may be made when desired as fall within the scope of the appended claims.

Having thus described my invention, I claim as new and desire to secure by Letters Patent:

1. The combination of a tire sleeve having longitudinal beads at its edges, a plurality of fasteners having members engaging the beaded portion of the sleeve on its inner and outer surfaces and shaped to slide on the bead from either end thereof, and a lacing for engaging the fasteners, said fasteners being frictionally held on the bead against longitudinal movement thereof, each fastener comprising a single-piece metal plate having opposite ends bent into bills extending from opposite sides for engagement respectively with the sleeve and lacing, one bill having a serrated edge, and a tongue struck out from the plate and having its free end disposed adjacent the serrated bill.

2. A fastener for a tire sleeve comprising a single-piece metal plate having opposite ends bent into bills extending from opposite sides, one bill having a serrated edge, and a tongue struck out from the plate and having its free end disposed adjacent the serrated bill.

3. A fastener for tire sleeves comprising a single-piece metal plate having an intermediate portion struck out into a longitudinal tongue and one extremity bent over to the side and adjacent the free end of the tongue for forming a bill and the opposite extremity bent back at the other side of the plate to form a bill, the bends of the bills being transverse to the length of the tongue.

In testimony whereof I have signed my name to this specification in the presence of two subscribing witnesses.

RAY YOST.

Witnesses:
G. S. SHATTUCK,
C. M. CLARK.

Copies of this patent may be obtained for five cents each, by addressing the "Commissioner of Patents, Washington, D. C."